United States Patent
Smeys et al.

(10) Patent No.: US 11,506,630 B2
(45) Date of Patent: Nov. 22, 2022

(54) INDUCTIVE HUMIDITY SENSOR AND METHOD

(71) Applicant: Texas Instruments Incorporated, Dallas, TX (US)

(72) Inventors: Peter Smeys, San Jose, CA (US); Joyce Marie Mullenix, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 478 days.

(21) Appl. No.: 15/856,490

(22) Filed: Dec. 28, 2017

(65) Prior Publication Data
US 2019/0204269 A1  Jul. 4, 2019

(51) Int. Cl.
*G01N 27/60* (2006.01)
*H01F 17/00* (2006.01)
(Continued)

(52) U.S. Cl.
CPC ......... *G01N 27/605* (2013.01); *G01D 5/2006* (2013.01); *G01N 27/225* (2013.01);
(Continued)

(58) Field of Classification Search
CPC .. G06F 16/24554; G06F 16/95; G06F 16/219; G06F 16/285; G06F 16/2255; G06F 16/24568
(Continued)

(56) References Cited

U.S. PATENT DOCUMENTS

| | | | | |
|---|---|---|---|---|
| 4,538,453 A | * | 9/1985 | Simmons | A24C 5/3412 73/73 |
| 4,683,418 A | * | 7/1987 | Wagner | G01N 22/04 324/664 |

(Continued)

FOREIGN PATENT DOCUMENTS

| | | | |
|---|---|---|---|
| CN | 102944325 A | * | 2/2013 |
| CN | 104833710 A | * | 8/2015 |

(Continued)

OTHER PUBLICATIONS

"HDC1010 Low Power, High Accuracy Digital Humidity Sensor with Temperature Sensor" Texas Instruments, SNAS685A—May 2016—Revised Aug. 2016, 30 pages.

(Continued)

*Primary Examiner* — Marrit Eyassu
(74) *Attorney, Agent, or Firm* — Charles A. Brill; Frank D. Cimino (57) ABSTRACT

Described examples include devices and methods for measuring relative humidity of an environment using inductance. The devices can include a resonant circuit, including a capacitor and an inductor. The inductor includes a moisture-absorbing core with at least a portion thereof exposed to an environment, with at least one magnetic property of the core being variable in response to changing levels of moisture in the environment. An excitation circuit provides an AC excitation signal to the resonant circuit. A sense circuit determines an inductance of the inductor according to a sense signal from the resonant circuit. The sense circuit is coupled to generate an output signal that indicates a humidity level of the environment according to the sense signal.

15 Claims, 6 Drawing Sheets

(51) Int. Cl.
*H01F 27/24* (2006.01)
*G01D 5/20* (2006.01)
*H01F 27/255* (2006.01)
*G01N 27/22* (2006.01)
*H01F 21/08* (2006.01)
*H01F 27/40* (2006.01)

(52) U.S. Cl.
CPC ....... *G01N 27/228* (2013.01); *H01F 17/0006* (2013.01); *H01F 21/08* (2013.01); *H01F 27/24* (2013.01); *H01F 27/255* (2013.01); *H01F 27/402* (2013.01)

(58) Field of Classification Search
USPC ..................................................... 73/335.02
See application file for complete search history.

(56) References Cited

U.S. PATENT DOCUMENTS

| | | | | |
|---|---|---|---|---|
| 6,025,725 | A * | 2/2000 | Gershenfeld | H01F 17/0006 324/652 |
| 6,437,582 | B1 * | 8/2002 | Rode | A01D 41/1277 324/658 |
| 7,902,661 | B2 * | 3/2011 | Smeys | H01L 21/4853 257/698 |
| 8,130,067 | B2 | 3/2012 | Lee et al. | |
| 10,541,529 | B2 * | 1/2020 | Harper | H05B 1/02 |
| 2012/0233849 | A1 | 9/2012 | Smeys et al. | |
| 2013/0063602 | A1 * | 3/2013 | Scapier | H04N 7/185 348/160 |
| 2013/0131618 | A1 * | 5/2013 | Abraham | A61F 13/42 604/361 |
| 2014/0049273 | A1 * | 2/2014 | Rocznik | G01R 27/2605 324/679 |
| 2016/0069662 | A1 | 3/2016 | Mullenix et al. | |
| 2016/0103084 | A1 * | 4/2016 | Kleczewski | G01N 27/028 324/652 |

FOREIGN PATENT DOCUMENTS

CN 104986719 A * 10/2015
IN 194695 B * 11/2004

OTHER PUBLICATIONS

"HDC1080 Low Power, High Accuracy Digital Humidity Sensor with Temperature Sensor" Texas Instruments, SNAS672A—Nov. 2015—Revised Jan. 2016, 30 pages.

* cited by examiner

FIG. 8

INDUCTIVE HUMIDITY SENSOR AND METHOD

BACKGROUND

Resistive or capacitive humidity sensors sense a change in dielectric constant or resistivity of a material (e.g., various polymers or ceramics) resulting from moisture absorption. The sensors output a signal corresponding to the relative humidity in the air surrounding the material. Many semiconductor-based relative humidity sensors suffer from hysteresis and/or long term sensor drift.

SUMMARY

Described examples include humidity sensor apparatus methods of measuring relative humidity of an environment using inductance. In at least one example, the sensor apparatus includes a resonant circuit with a capacitor and an inductor. The inductor includes a moisture-absorbing core with at least a portion of the core exposed to an environment. At least one magnetic property of the core is variable in response to changing levels of moisture in the environment. The apparatus includes an excitation circuit to provide an AC excitation signal to the resonant circuit. Also, the apparatus includes a sense circuit to determine an inductance of the inductor according to a sense signal from the resonant circuit, and to generate an output signal indicating a humidity level of the environment according to the sense signal.

Further described examples include humidity sensing methods. One example method includes providing an excitation signal to a resonant circuit having a capacitor and an inductor with a core exposed to an environment. A magnetic property of the core is variable in response to changing levels of moisture in the environment. The method further includes sensing an inductance of the inductor, and generating an output signal indicating a humidity level of the environment according to the inductance.

In a described method of fabricating a humidity sensor, a resonant circuit is formed on a substrate. The resonant circuit includes a capacitor and an inductor. The inductor includes a conductive structure that forms at least one turn, and a moisture-absorbing core mounted on the substrate proximate conductive structure with at least a portion of the core exposed to an environment. The core and the conductive structure are magnetically coupled to form the inductor. At least one magnetic property of the core is variable in response to changing levels of moisture in the environment. The method further includes forming an excitation circuit on the substrate. The excitation circuit includes an output coupled to provide an AC excitation signal to the resonant circuit. Also, the method includes forming a sense circuit on the substrate to sense an inductance of the inductor. The sense circuit is coupled to generate an output signal that indicates a humidity level of the environment according to the inductance of the inductor.

DETAILED DESCRIPTION

In the drawings, like reference numerals refer to like elements throughout, and the various features are not necessarily drawn to scale. As used herein, the terms "couple," "coupled" and "couples" include indirect or direct electrical or mechanical connection or combinations thereof. For example, if a first device couples to or is coupled with a second device, that connection may be through a direct electrical connection, or through an indirect electrical connection via one or more intervening devices and connections.

Figure 1:
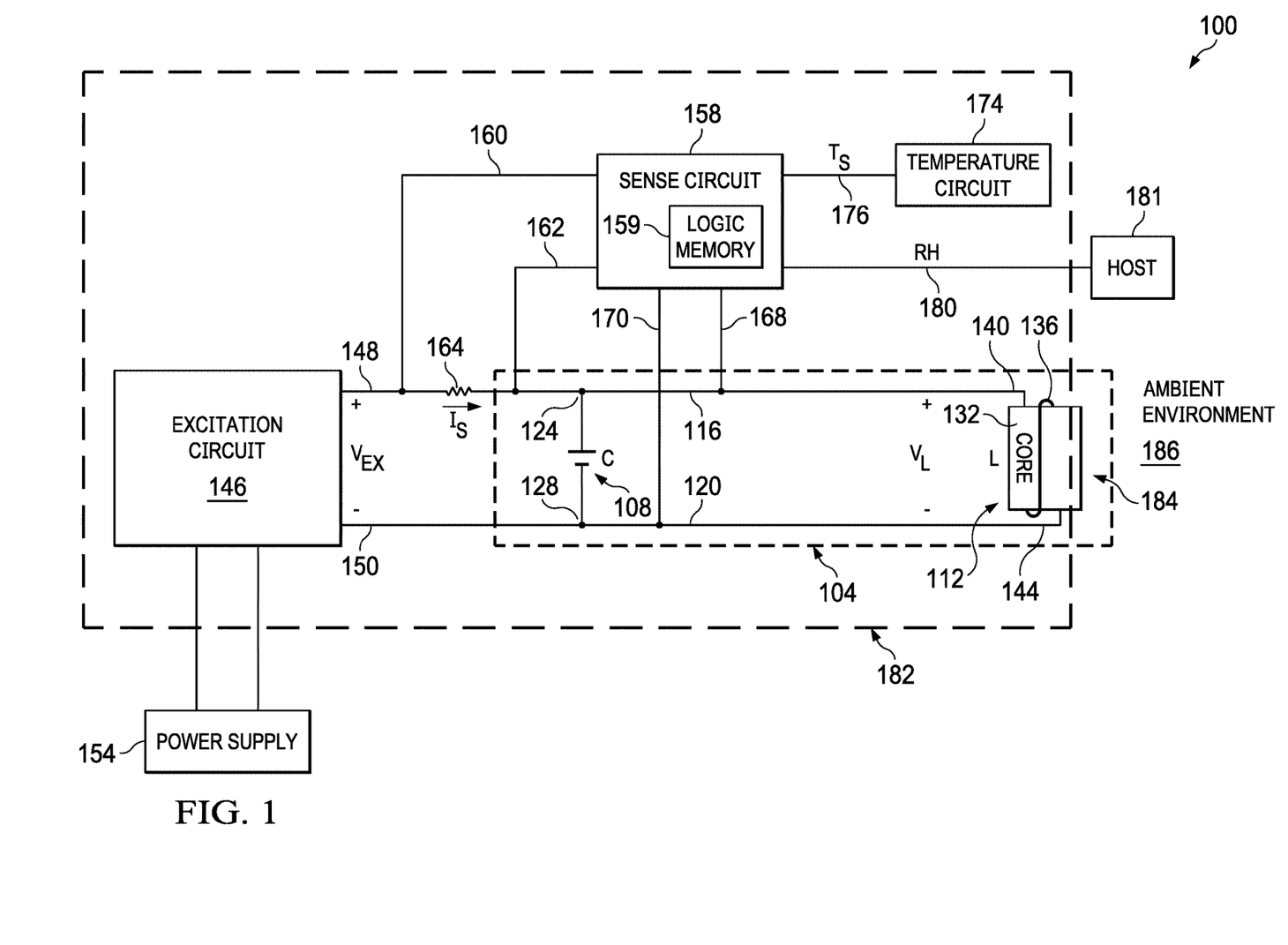
FIG. 1 is a schematic diagram of an example circuit according to one embodiment.

FIG. 1 shows an example humidity sensor apparatus 100. The apparatus 100 includes an inductor-capacitor parallel resonant circuit 104, with a capacitor 108 and an inductor 112 arranged in parallel. The example parallel resonant circuit 104 has first and second resonant circuit nodes 116 and 120. A first terminal 124 of the capacitor 108 is connected to the first resonant circuit node 116, and a second terminal 128 is connected to the second resonant circuit node 120. The inductor 112 includes a core 132 and a coil 136 including at least one turn magnetically coupled with the core 132. A first end 140 of the coil 136 is connected to the first resonant circuit node 116, and a second end 144 of the coil 136 is coupled with the second resonant circuit node 120. The core 132 in some examples includes a porous, moisture-absorbing ferrite material, such as Mg ferrite+ CaO, MgMn ferrite, MgCuGa ferrite, or MgZn+KCl. In various embodiments, one or more magnetic properties of the core 132 are variable in response to changing levels of moisture in the environment of all or an exposed portion of the core 132.

The sensor apparatus 100 includes an excitation circuit 146 with a first output 148 coupled with the first resonant circuit node 116 through a sense resistor 164. The excitation circuit 146 further includes a second output 150 connected to the second resonant circuit node 120. The excitation circuit 146 receives power from a power supply 154. The excitation circuit 146 provides an AC excitation signal to the resonant circuit 104 via the first and second outputs 148 and 150.

The sensor apparatus 100 includes a sense circuit 158 with first and second inputs 160 and 162 connected across the sense resistor 164 to sense a current $I_s$ of the resonant circuit 104. The sense circuit 158 also has third and fourth inputs 168 and 170 connected to the first and second nodes 116 and 120, respectively, to sense a voltage $V_L$ across the inductor 112. In one example, a temperature circuit 174 provides a temperature signal $T_s$ to the sense circuit via a fifth input 176. The example sense circuit 158 has a communication interface 180, such as a single or multi-line serial data communications link, which allows communications with a connected host circuit 181. In one example, the sense circuit 158 includes logic and memory circuitry 159 that stores calibration data and implements logical operations including data exchange with the host circuit 181. In operation, the sense circuit 158 provides an output signal RH to the host circuit 181 via the communications interface 180. The signal RH indicates a humidity level of the ambient environment 186 near the sensor apparatus 100 according to (e.g., in response to) one or more input signals (e.g., sense current signal $I_s$, inductor voltage signal $V_L$, temperature signal $T_s$).

In the illustrated example, the resonant circuit 104, the excitation circuit 146, the sense circuit 158 and the temperature circuit 174 are located within an enclosure 182. A portion 184 of the core 132 of the inductor 112 is exposed to the ambient environment 186 external to the enclosure 182. More or less of the core 132 can be exposed to the ambient environment 186, and/or other components of the sensor apparatus 100 can be exposed to the ambient environment 186 if desired. In some applications it can be desirable to encapsulate as much of the apparatus 100 as possible, with the exception of portion 184 of the core 132 to protect the apparatus 100 from corrosion and/or dust, etc. The enclosure 182 can be, for example, a potting material, encapsulation compound or a layer of semiconductor material. In some examples, the temperature circuit 174 includes a sensor element, such as a portion of a resistive temperature device (RTD), or a thermocouple (T/C), and a portion of the sensor element is exposed to the ambient environment 186 in order to sense the ambient temperature near the sensor apparatus 100.

The core 132 of the inductor 112 is a moisture-absorbing core. At least one magnetic property of the core 132 is variable in response to a level of humidity in the ambient environment 186. The portion 184 of the core 132 that is exposed to the ambient environment 186 allows the core 132 to absorb and/or release moisture as the humidity level in the ambient environment 186 changes. The change in the one or more magnetic properties of the core 132 as moisture is absorbed and/or released is sensed by the sense circuit 158 and is used to generate the output signal RH.

Figure 2:
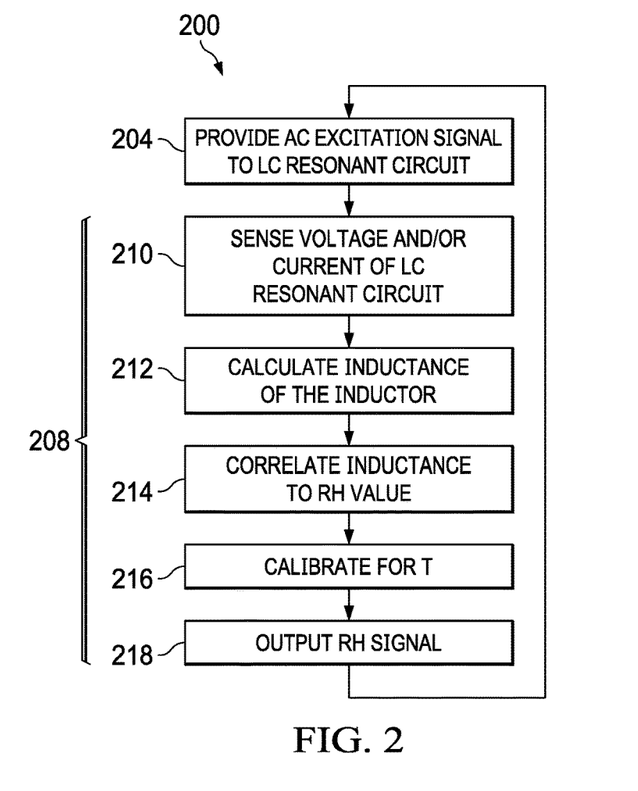
FIG. 2 is a flowchart illustrating an example method of sensing humidity according to one embodiment.

FIG. 2 shows an example method 200 of sensing humidity. In one example, the method 200 can be implemented using the apparatus 100 in FIG. 1. At 204, the excitation circuit 146 provides an AC excitation signal $V_{EX}$ to the resonant circuit 104 as a voltage signal between the excitation circuit outputs 148 and 150. In one example, the AC excitation signal $V_{EX}$ is a sweeping signal (e.g., variable frequency AC voltage signal). In another example, the excitation signal $V_{EX}$ is a constant frequency AC voltage signal generated by the excitation circuit 146 at a predetermined frequency. At 208, the sense circuit 158 determines the inductance L of the inductor 112 and generates an output signal (RH in FIG. 1) according to the inductance L. In one example, the sense circuit 158 senses a voltage and/or current of the resonant circuit 104 at 210. In this example, the sense circuit 158 calculates an inductance L of the inductor 112 at 212 in FIG. 2. At 214, the sense circuit 158 correlates the inductance L of the resonant circuit 104 to a relative humidity value. In one example, at 216, the sense circuit 158 calibrates or compensates the relative humidity value for temperature with temperature information from the temperature circuit 174. At 218, the sense circuit 156 provides the output signal RH that indicates a humidity level of the environment 186 to the host circuit 181 via the communications interface 180. In one possible implementation, the process 200 is repeated in a series of sensing or humidity detection cycles, and the system returns to 204 for a new cycle following generation of the relative humidity signal at 218.

Figure 3:
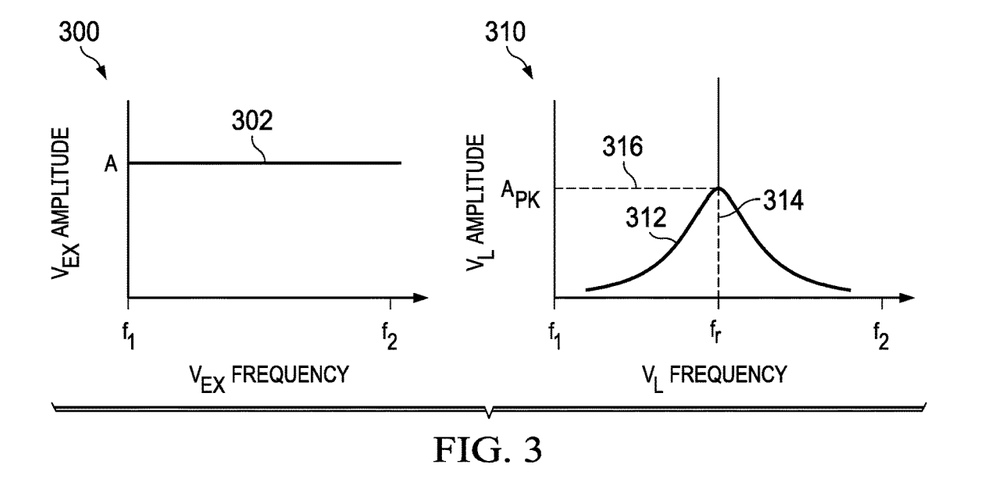
FIG. 3 illustrates example excitation voltage signal amplitude and sense voltage signal amplitude graphs of a first humidity sensing example using a frequency sweep excitation signal.
Figure 4:
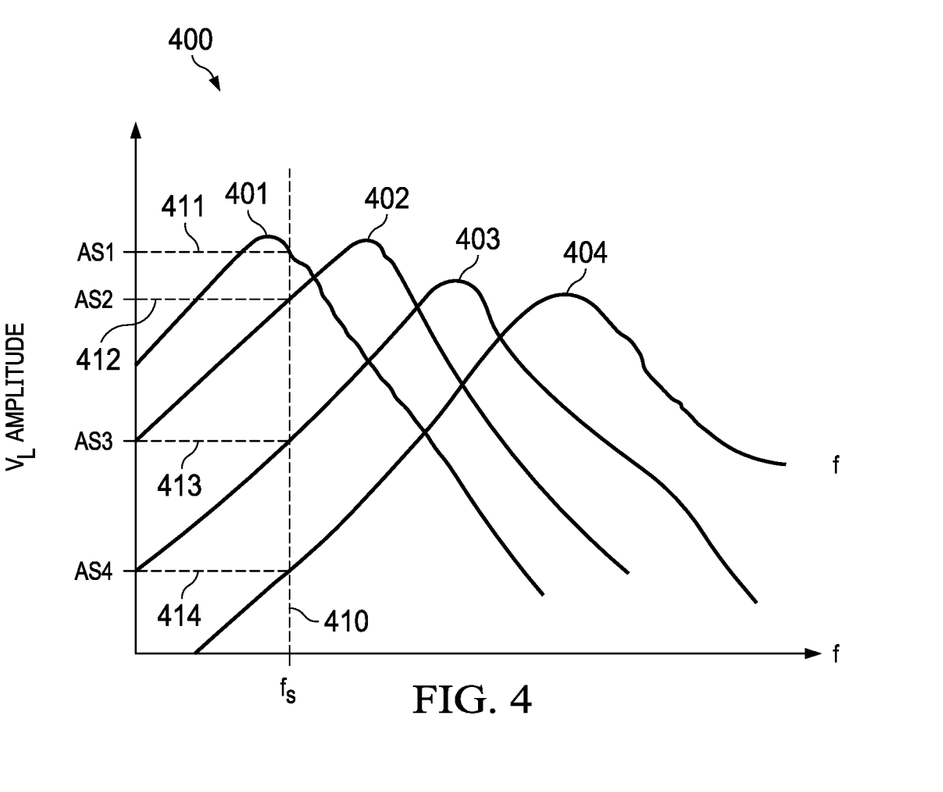
FIG. 4 illustrates a graph showing a voltage signal amplitude graph of a second humidity sensing example using a single frequency excitation signal.

Referring also to FIGS. 3 and 4, example implementations can use different techniques for generating the output signal RH that indicates the humidity level of the environment. FIG. 3 shows a graph 300 with an excitation voltage signal amplitude curve 302 that represents the peak-to-peak amplitude of the excitation voltage signal $V_{EX}$ in one example. In this example, the excitation circuit 146 applies the excitation voltage signal $V_{EX}$ with a generally constant amplitude A over a frequency range from a first frequency $f_1$ to a second frequency $f_2$. A graph 310 in FIG. 3 shows a curve 312 that represents the amplitude of the sense voltage signal $V_L$ from $f_1$ to $f_2$. In this first humidity sensing example, the excitation circuit 146 provides a variable frequency excitation signal to the resonant circuit 104 while the sense circuit 158 monitors the sense voltage signal $V_L$ from resonant circuit 104 and determines the resonant frequency 314 ($f_r$) that corresponds to a peak amplitude 316 ($A_{PK}$) of the sense voltage amplitude curve 312. As the inductor core 132 absorbs or releases moisture, the resonant frequency $f_r$ of the resonant circuit 104 varies. In at least one example, the sense circuit 158 is configured to correlate a given sensed resonant frequency $f_r$ to a relative humidity value. In this regard, the sense circuit 158 can include a look-up table (e.g., in the logic and memory circuit 159 of FIG. 1) for correlating a given resonant frequency $f_r$ to a relative humidity value.

FIG. 4 illustrates another example excitation and sensing method, which can be implemented by the sensor apparatus 100 of FIG. 1. A graph 400 in FIG. 4 shows four example voltage signal amplitude curves 401, 402, 403 and 404 as a function of excitation frequency for four corresponding inductance values of the resonant circuit inductor 112. The curves 401-404 have unique resonant frequencies at which the sense voltage amplitude is at a local peak. In one example, the excitation circuit 146 applies the excitation voltage signal $V_{EX}$ to the resonant circuit 104 at a predetermined amplitude with a generally predetermined frequency 410 ($f_S$). The sense circuit 158 detects the amplitude of the sense signal (e.g., $V_L$ and/or $I_S$ in FIG. 1). In the example of FIG. 4, the individual curves 401, 402, 403 and 404 have corresponding amplitudes 411 (AS1), 412 (AS2), 413 (AS3) and 414 (AS4), respectively, at the frequency 410. In operation, the sense circuit 158 senses the amplitude of the sense signal from the resonant circuit 104 (e.g., the voltage $V_L$ across the inductor 112).

The sense circuit 158 in this example correlates the sensed signal amplitude to one of the curves 402-404 to determine a corresponding inductance value L for the inductor 112, and determines a corresponding relative humidity value. The sense circuit 158, in one example, stores the amplitude values AS1-AS4 in a look up table (LUT) in the logic and memory circuit 159 of FIG. 1, and performs linear interpolation to determine the relative humidity value. The values AS1-AS4 in one example are measured during manufacturing calibration and stored in the memory 159. In another example, the circuit 159 stores parameters based on a manufacturing calibration process, and the sense circuit 158 solves a parametric equation using the stored calibration parameter values to determine the relative humidity value according to the measured sense signal amplitude. Although four example curves 401-404 and four corresponding amplitude values AS1-AS4 are described, any number of calibration values can be used. In one example, the circuit 159 stores calibration values corresponding to inductance values for a range of 0 to 100% relative humidity.

In other examples, the excitation circuit 146 provides a single frequency excitation signal to the resonant circuit 104 as described above in connection with FIG. 4, and the sense circuit 158 senses both the current and voltage ($I_s$ and $V_L$) of the resonant circuit 104. The sense circuit 158 determines a power consumption value or resonant circuit impedance value according to the sensed current and voltage signals $I_s$ and $V_L$. In one example, the logic and memory circuit 159 stores resonant circuit power or circuit impedance values corresponding to ambient humidity values in a lookup table based on a calibration process. The sense circuit 158 correlates the sensed signal values signals $I_s$ and $V_L$ using linear interpolation based on the power consumption or impedance values of the LUT in the memory circuit 159. In another example, the excitation circuit provides a variable frequency sweep excitation signal, as described hereinabove in connection with FIG. 3, and determines a frequency that corresponds to a peak or valley (e.g., local minima) of the resonant circuit power consumption or impedance.

The foregoing method 200 and apparatus 100 for determining relative humidity can be employed alone or in combination with each other. In addition, the sensor apparatus 100 in some examples use the magnetic properties of the core 132 that change in response to an amount of moisture. In one example, the inductor core 132 includes one or more core materials that exhibit decreasing resistivity as relative humidity increases. This property is used in the techniques hereinabove to correlate the sensed current and/or voltage to a relative humidity value.

Figure 5:
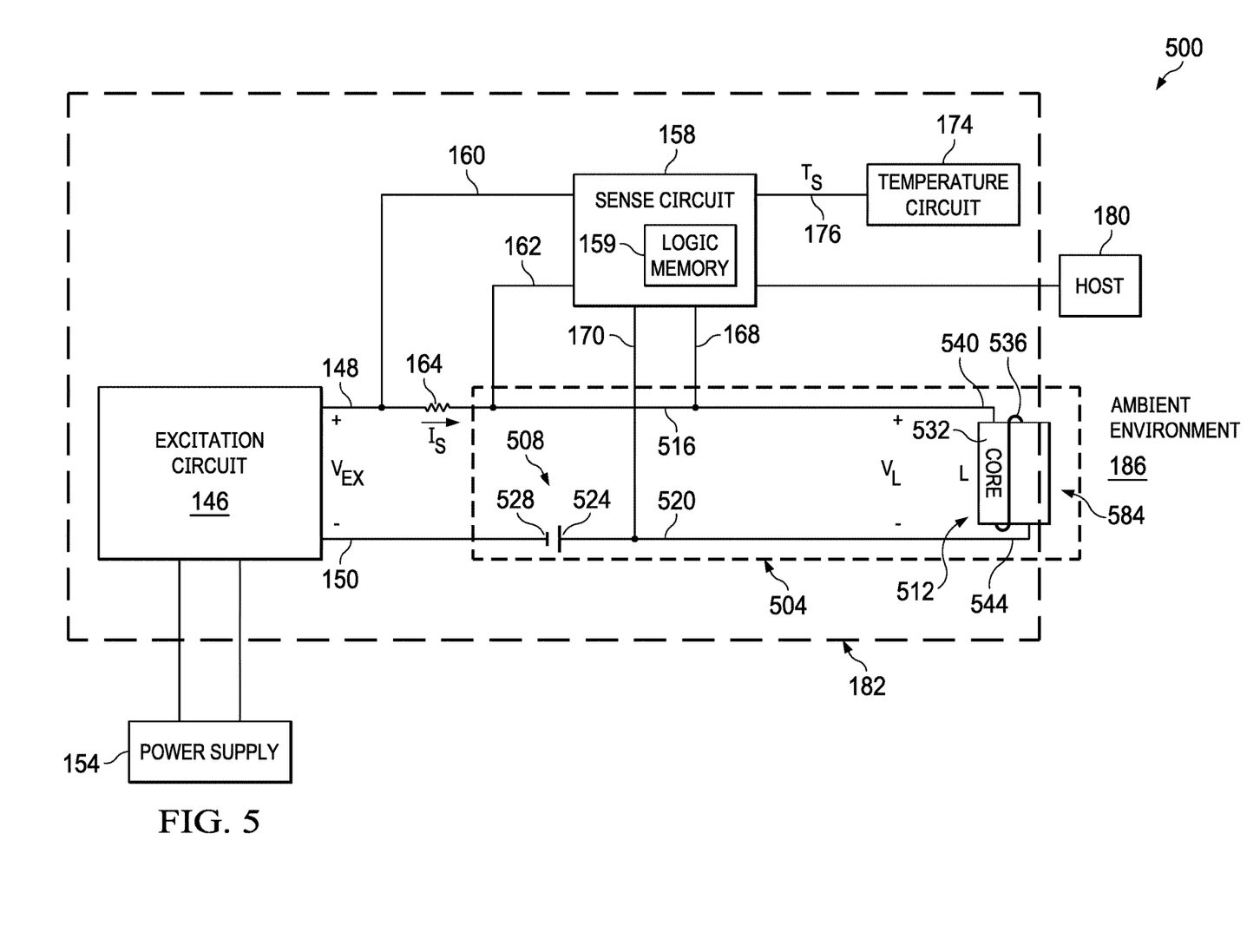
FIG. 5 is a schematic diagram of another example circuit according to a second embodiment.

FIG. 5 illustrates another example humidity sensor apparatus 500. The apparatus 500 is similar to apparatus 100 of FIG. 1, however, the apparatus 500 includes a series inductor-capacitor resonant circuit 504. The series resonant circuit 504 includes a capacitor 508 and an inductor 512 connected in series. The inductor 512 is the same as the inductor 112 described above. The resonant circuit 504 has first and second nodes 516 and 520. First and second terminals 524 and 528 of the capacitor 508 are connected to the second resonant circuit node 520. The inductor 512 includes a core 532 and a coil 536 including at least one turn. At least a portion 584 of the core 532 is exposed to ambient environment 186. A first end 540 of the coil 536 is connected to the first resonant circuit node 516, and a second end 544 of the coil 536 is coupled with the second resonant circuit node 520. The excitation circuit 146 in FIG. 5 includes first and second output leads 148 and 150 as described hereinabove, which are connected to the first and second resonant circuit nodes 516 and 520, respectively. The excitation circuit 146 receives power from a power supply 154 and provides an AC excitation signal (e.g., $V_{EX}$) to the resonant circuit 504 via the first and second outputs 148 and 150.

Sense circuit 158 has first and second inputs 160 and 162 connected to the first node 516 of the resonant circuit 504 across sense resistor 164 for sensing current $I_s$ of the resonant circuit 504. The sense circuit 158 also has third and fourth inputs 168 and 170 connected to the first and second nodes 516 and 520 for sensing voltage $V_L$ across the inductor 512. A temperature circuit 174 provides a temperature signal $T_s$ to the sense circuit via a fifth input 176. The apparatus 500 of FIG. 5 can be operated in the same manner as the apparatus 100 of FIG. 1 (e.g., in accordance with the method 200 shown and described in connection with FIGS. 2-4).

Figure 6:
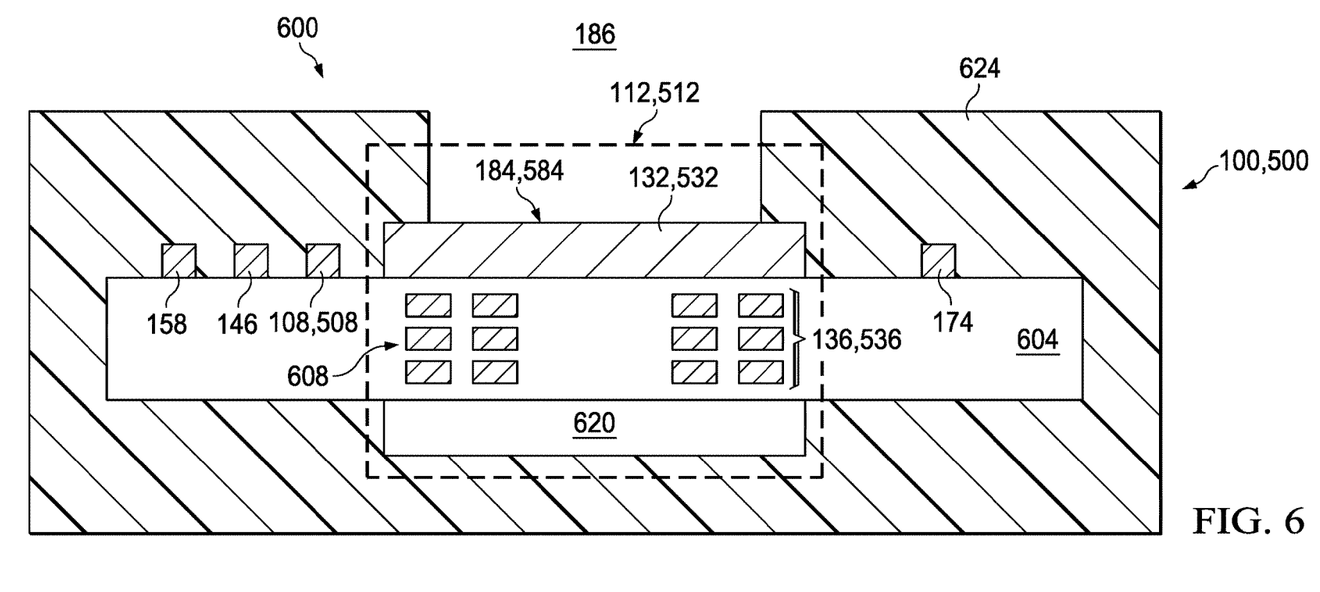
FIG. 6 is a cross-sectional view of an example PCB-based embodiment of the circuits of FIG. 1 or FIG. 5.
Figure 7:
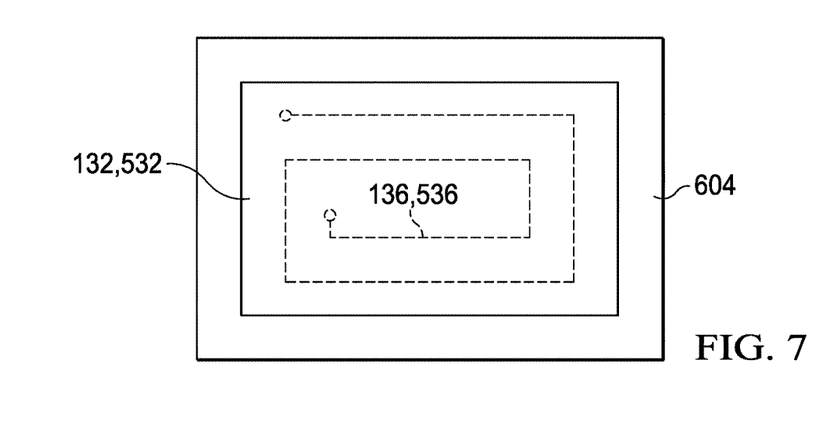
FIG. 7 is a plan view of an example inductor having a planar conductor coil.

Referring now to FIGS. 6 and 7, FIG. 6 shows an example device 600 that includes the relative humidity sensor apparatus 100, 500 described hereinabove. The device 600 in one example includes a multi-layer printed circuit board (PCB) 604 with a conductive structure 608 that forms at least one turn of the resonant circuit inductor 112, 512. The conductive structure 608 in this example includes conductive traces formed on multiple layers of the multi-layer PCB structure 604, which are interconnected by vias (not shown) to form the inductor coil 136, 536 with at least one turn. In this example, the coil 136, 536 has multiple turns formed in multiple levels within the PCB 604. The conductive structure 608 is proximate the core 132, 532. The core 132, 532 in one example is mounted on a top or first side of the PCB 604 such that the core 132, 532 and the conductive structure 608 are magnetically coupled to form the inductor 112, 512. Many coil arrangements are possible. For example, FIG. 7 illustrates a planar coil arrangement in which the core 132, 532 is mounted over a planar coil 136, 536 formed as a multi-turn conductive trace on the surface of the PCB 604. In some examples, the coil 136, 536 is constructed as multiple conductive traces formed on multiple layers of the multi-layer PCB 604.

In the example of FIGS. 6 and 7, the excitation circuit 146, the sense circuit 158, the capacitor 108, 508, and the temperature circuit 174 are mounted on the top side of the PCB 604. In this example, moreover, flux concentrator 620 is mounted to the bottom side of the PCB 604 below the conductor structure 608. A molding compound 624 surrounds/encloses/encapsulates all of the components except for a portion 184, 584 of the core 132, 532 that is exposed to the ambient environment 186. In this example, only a top surface of the core 132, 532 is exposed to the ambient environment 186, with side portions of the core 132, 532 encapsulated by the molding compound. In other examples, additional portions of the core 132, 532 can be exposed to the ambient environment 186.

Figure 8:
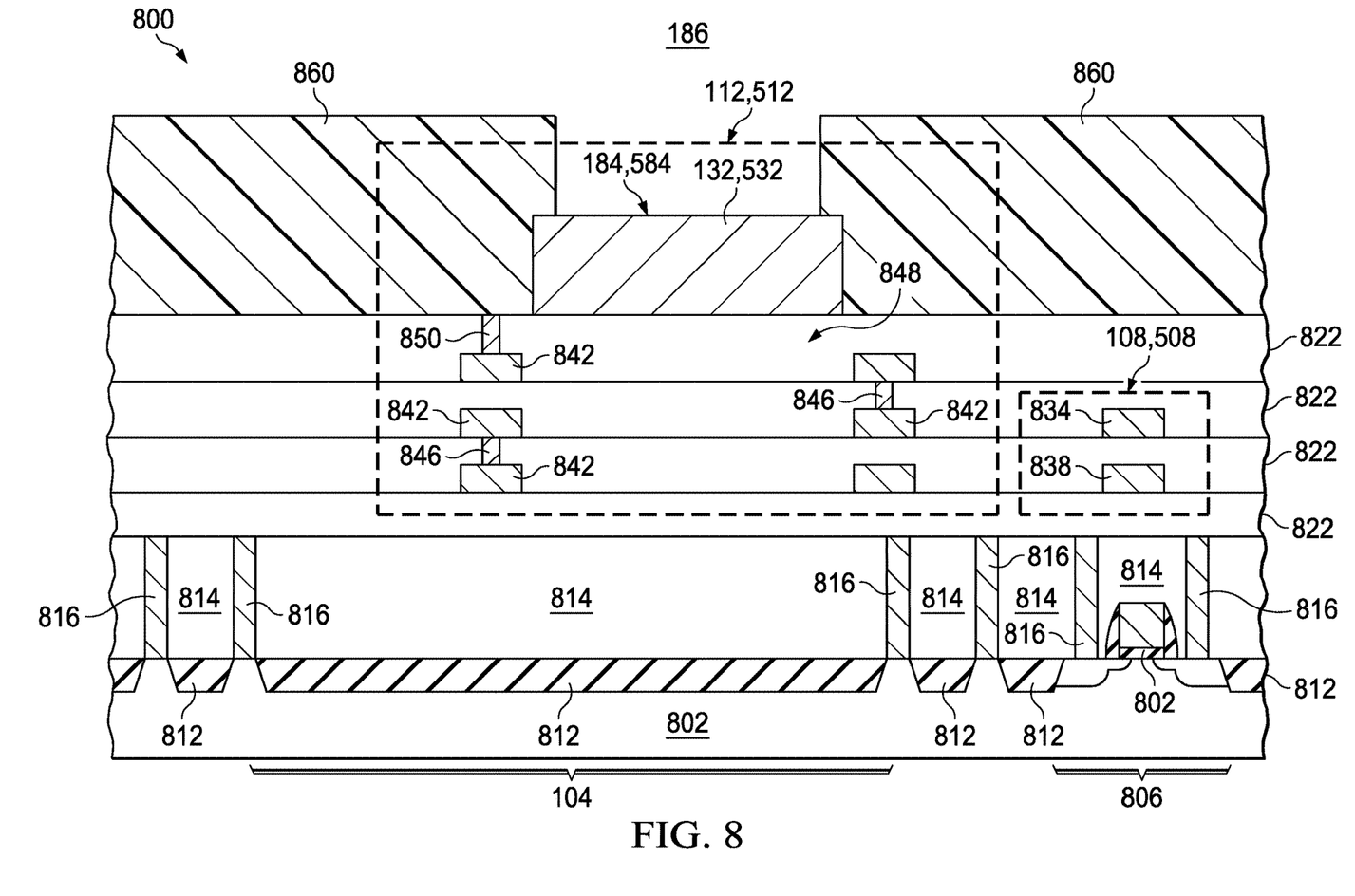
FIG. 8 is a cross-sectional view of an example IC chip-based embodiment of the circuits of FIG. 1 or FIG. 5.

FIG. 8 illustrates another implementation, in which the resonant circuit inductor is formed on or in an integrated circuit. FIG. 8 shows a cross-section of an example microelectronic device 800 that includes one or more parts of the exemplary relative humidity sensor apparatus 100, 500 is illustrated. In the instant example, the microelectronic device is described as an integrated circuit 800, which includes the inductor 112, 512, the capacitor 108, 508. Other configurations for the microelectronic device 800 such as a standalone component or a hybrid circuit, are within the scope of the instant example.

The microelectronic device 800 is formed on a substrate 802 such as a silicon wafer. Field oxide 812 may be formed in the substrate 802 to laterally isolate elements of the microelectronic device 800. A pre-metal dielectric (PMD) layer 814 is formed over the substrate 802. Contacts 816 are disposed through the PMD layer 814 to provide electrical connections for various low voltage components 806, such as transistors that form one or more of the excitation circuit 146, the sense circuit 158 and/or the temperature circuit 174. A plurality of intra-metal dielectric (IMD) layers 822 are formed of silicon dioxide ($SiO_2$) or other low dielectric constant material above the PMD layer 814. The IMD layers 822 in one example include capacitor layers to form the resonant circuit capacitor 108, 508, as well as etch stop layers of different dielectric materials, such as silicon nitride, etc. The microelectronic device 800 in this example includes the resonant circuit 104, 504 depicted in FIG. 1 or FIG. 5. In the example of FIG. 8, both the capacitor 108, 508 and the inductor 112, 512 are formed in or on one or more of the IMD layers 822. In different implementations, the capacitor 108, 508 can be connected in series or in parallel with the inductor 112, 512 depending on the particular configuration of the resonant circuit 104, 504.

The capacitor 108, 508 includes upper and lower conductive structures 834 and 838 (e.g., capacitor plates) formed on respective IMD layers 822, with intervening IMD dielectric material. The inductor 112, 512 includes a plurality of conductive structures 842 on multiple levels of IMD layers 822. The conductive structures 842 of the inductor, and the capacitor plate structures 834 and 838 in this example are formed as part of an integrated circuit metallization fabrication process. The conductive structures 842, together or singly, form at least one turn and are interconnected by vias 846 to form a multi-layer coil 848. The core 132, 532 is mounted to the top IMD layer 822 in proximity to the multi-layer coil 848 such that the core 132, 532 and the multi-layer coil 848 are magnetically coupled to form the inductor 112, 512. A contact 850 is provided for connecting the conductive structures 842 to external circuitry, such as the excitation circuit 146, sense circuit 158, etc. In another example, one or both of the excitation circuit 146 and sense circuit 158 can be integral with the microelectronic device 800, with suitable interconnections (not shown) to the capacitor 108, 508 and the inductor 112, 512. An encapsulation compound 860 encapsulates at least a portion of the core 132, 532 while leaving a portion 184, 584 of the core structure 132, 532 exposed to the ambient environment 186. In the above examples, the portion 184, 584 of the core 132, 532 that is exposed to the ambient environment 186 is depicted as planar. In other examples, the portion 184, 584 can be textured, contoured or otherwise shaped to increase the surface area of the core 132, 532 exposed to the ambient environment 186.

The example devices 600 and 800 can be fabricated by forming the resonant circuit 104, 504 on a substrate (e.g., PCB substrate 604, integrated circuit's semiconductor substrate 802). In certain examples, the resonant circuit inductor 112, 512 includes the conductive structure 608, 842 that forms at least one turn, and the moisture-absorbing core 132, 532 is mounted on the substrate 604, 802 proximate the conductive structure 608, 842. In this manner, the core 132, 532 and the conductive structure 608, 842 are magnetically coupled to form the inductor 112, 512. The resonant circuit 104, 504 is coupled with the excitation circuit 146, the sense circuit 158 and/or temperature circuit 174 by various conductors and/or vias formed on or in the substrate 604, 802. In other examples, the various circuits can be interconnected by wires, bond wires, or other suitable electrical interconnection structures. In the example of FIGS. 6 and 7, the substrate is a printed circuit board structure 604. In the example of FIG. 8, the substrate is a semiconductor substrate 802.

Modifications are possible in the described embodiments, and other embodiments are possible, within the scope of the claims.

What is claimed is:

1. A device comprising:
   a semiconductor substrate;
   a stack of dielectric layers including first, second, and third dielectric layers, the first dielectric layer over the semiconductor substrate, the second dielectric layer on the first dielectric layer, and the third dielectric layer on the second dielectric layer;
   a capacitor including first and second conductive plates, the first conductive plate on the first dielectric layer, and the second conductive plate on the second dielectric layer;
   an inductor including a multi-layer coil and a ferrite core, the ferrite core having a magnetic property that changes responsive to an amount of moisture absorbed into the ferrite core, the multi-layer coil having first and second conductive structures, the first conductive structure on the first dielectric layer and spaced from the first conductive plate, the second conductive structure on the second dielectric layer and spaced from the second conductive plate, the second dielectric layer overlaying the first conductive plate and the first conductive structure, the third dielectric layer overlaying the second conductive plate and the second conductive structure, and the ferrite core over the stack of dielectric layers;
   an encapsulation compound over the third dielectric layer and partially surrounding the ferrite core, the encapsulation compound having an opening extending from an external surface of the encapsulation compound to an external surface of the ferrite core;
   an excitation circuit coupled to the capacitor and the inductor; and
   a sense circuit coupled to the capacitor and the inductor.

2. The device of claim 1, wherein the excitation circuit and the sense circuit are on the semiconductor substrate.

3. The device of claim 1, further comprising a temperature circuit coupled to the sense circuit and configured to sense a temperature of the device.

4. The device of claim 1, wherein the sense circuit is configured to determine an inductance of the inductor responsive to a change in the magnetic property of the ferrite core.

5. The device of claim 1, wherein:
   the inductor further includes a third conductive structure on the third dielectric layer;
   the stack of dielectric layers further includes a fourth dielectric layer on the third dielectric layer and overlaying the third conductive structure; and
   the ferrite core and the encapsulation compound are on the fourth dielectric layer.

6. The device of claim 1, wherein the ferrite core includes a porous ferrite material including at least one of: Mg ferrite+CaO, MgMn ferrite, MgCuGa ferrite, or MgZn+KCl.

7. The device of claim 1, wherein the magnetic property of the ferrite core is resistivity.

8. A method of fabricating a device, the method comprising:
   forming a stack of dielectric layers including first, second, and third dielectric layers, the first dielectric layer formed over a semiconductor substrate, the second dielectric layer formed on the first dielectric layer, and the third dielectric layer formed on the second dielectric layer;
   forming a capacitor on the first and second dielectric layers, the capacitor having first and second conductive plates, the first conductive plate formed on the first dielectric layer, and the second conductive plate formed on the second dielectric layers;
   forming an inductor on the first and second dielectric layers, the inductor having a coil and a ferrite core, the ferrite core having a magnetic property that changes responsive to an amount of moisture absorbed into the ferrite core, the coil having first and second conductive structures, the first conductive structure formed on the first dielectric layer and spaced from the first conductive plate, the second conductive structure formed on the second dielectric layer and spaced from the second conductive plate, the second dielectric layer overlaying the first conductive plate and the first conductive structure, the third dielectric layer overlaying the second conductive plate and the second conductive structure, and the ferrite core formed over the stack of dielectric layers; and
   coupling the capacitor to the inductor.

9. The method of claim 8, further comprising:
forming an excitation circuit and a sense circuit on the semiconductor substrate;
coupling the excitation circuit and the sense circuit to the capacitor and the inductor;
forming a compound over the third dielectric layer and partially surrounding the ferrite core; and
forming an opening in the compound, the opening extending from an external surface of the compound to an external surface of the ferrite core.

10. The method of claim 9, wherein:
the inductor further includes a third conductive structure formed on the third dielectric layer;
the stack of dielectric layers further includes a fourth dielectric layer formed on the third dielectric layer and overlaying the third conductive structure; and
the ferrite core and the compound are formed on the fourth dielectric layer.

11. A sensor apparatus comprising:
a semiconductor substrate;
a stack of dielectric layers including first, second, and third dielectric layers, the first dielectric layer over the semiconductor substrate, the second dielectric layer on the first dielectric layer, and the third dielectric layer on the second dielectric layer;
a capacitor including first and second conductive plates, the first conductive plate on the first dielectric layer, and the second conductive plate on the second dielectric layer; and
an inductor including a coil and a ferrite core, the ferrite core having a magnetic property that changes responsive to an amount of moisture absorbed into the ferrite core, the coil having first and second conductive structures, the first conductive structure on the first dielectric layer and spaced from the first conductive plate, the second conductive structure on the second dielectric layer and spaced from the second conductive plate, the second dielectric layer overlaying the first conductive plate and the first conductive structure, the third dielectric layer overlaying the second conductive plate and the second conductive structure, and the ferrite core over the stack of dielectric layers.

12. The sensor apparatus of claim 11, further comprising a compound over the third dielectric layer and partially surrounding the ferrite core, the compound having an opening extending from an external surface of the compound to an external surface of the ferrite core.

13. The sensor apparatus of claim 11, further comprising:
an excitation circuit coupled to the inductor and the capacitor; and
a sense circuit coupled to the inductor and the capacitor, the sense circuit configured to determine an inductance of the inductor responsive to a change in the magnetic property of the ferrite core.

14. The sensor apparatus of claim 13, wherein the excitation circuit and the sense circuit are on the semiconductor substrate.

15. The sensor apparatus of claim 11, wherein:
the inductor further includes a third conductive structure on the third dielectric layer;
the stack of dielectric layers further includes a fourth dielectric layer on the third dielectric layer and overlaying the third conductive structure; and
the ferrite core is on the fourth dielectric layer.

* * * * *